United States Patent [19]

Grigsby, Jr. et al.

[11] Patent Number: 4,469,824

[45] Date of Patent: Sep. 4, 1984

[54] LIQUID TEREPHTHALIC ESTER POLYOLS AND POLYISOCYANURATE FOAMS THEREFROM

[75] Inventors: Robert A. Grigsby, Jr., Georgetown; George P. Speranza; Michael E. Brennan, both of Austin, all of Tex.

[73] Assignee: Texaco, Inc., White Plains, N.Y.

[21] Appl. No.: 553,272

[22] Filed: Nov. 18, 1983

[51] Int. Cl.$^3$ .................. C08G 18/14; C08G 18/00
[52] U.S. Cl. ................................. 521/173; 521/48; 521/48.5; 521/172; 521/175; 521/902; 252/182; 528/83; 528/84
[58] Field of Search ............ 528/84, 83; 521/172, 521/173, 48, 175, 48.5, 902; 252/182

[56] References Cited

U.S. PATENT DOCUMENTS

| | | | |
|---|---|---|---|
| 2,965,615 | 12/1960 | Tess | 521/176 |
| 3,446,758 | 5/1969 | Wiener | 521/48.5 |
| 3,488,298 | 1/1970 | Barkey et al. | 521/48.5 |
| 3,647,759 | 3/1972 | Walker | 260/75 R |
| 3,951,886 | 5/1976 | Miyake et al. | 521/48.5 |
| 4,039,487 | 8/1977 | Kolakowski et al. | 521/129 |
| 4,048,104 | 9/1977 | Svoboda et al. | 260/2.5 AN |
| 4,092,276 | 5/1978 | Narayan | 521/108 |
| 4,094,828 | 6/1978 | Klein | 521/177 |
| 4,223,068 | 9/1980 | Carlstrom et al. | 428/310 |
| 4,233,408 | 11/1980 | Satterly | 521/172 |
| 4,246,365 | 1/1981 | Wiedermann et al. | 521/172 |
| 4,309,532 | 1/1982 | Cuscurida et al. | 525/507 |
| 4,346,229 | 8/1982 | Derr et al. | 560/91 |

*Primary Examiner*—Herbert S. Cockeram
*Attorney, Agent, or Firm*—Jack H. Park; Kenneth R. Priem; David L. Mossman

[57] ABSTRACT

Terephthalic esters may be made to remain in a liquid form by reacting recycled or scrap polyethylene terephthalate (PET) with diethylene glycol and one or more oxyalkylene glycols and stripping out some of the ethylene glycol present. The mole ratio of glycols to scrap PET should also be greater than 1.2:1. This process keeps any diesters from separating out of the solution as solids. These liquid terephthalic esters are useful as polyol extenders in rigid polyurethane foams and as the sole polyol component in polyisocyanurate foams.

17 Claims, No Drawings

LIQUID TEREPHTHALIC ESTER POLYOLS AND POLYISOCYANURATE FOAMS THEREFROM

BACKGROUND OF THE INVENTION

1. Field of the Invention

The invention relates to polyols useful in the preparation of rigid polyurethane and polyisocyanurate foams, and more particularly relates to aromatic polyester polyols made from reactions of recycled polyethylene terephthalate with oxyalkylene glycols which have a liquid form.

2. Description of Other Relevant Compounds in the Field

It is known to prepare polyurethane foam by the reaction of polyisocyanate, a polyol and a blowing agent such as a halogenated hydrocarbon, water or both, in the presence of a catalyst. One particular area of polyurethane technology is based upon rigid polyurethane foams.

The art is replete with a wide variety of polyols useful as one of the main components in preparing polurethanes such as polyurethane foams. As an example, U.S. Pat. No. 2,965,615 suggests use of co-polymers of alkenyl-substituted aromatic compounds such as styrene, and ethylenically unsaturated monohydric alcohols such as allyl alcohol as a useful resinous polyol in urethane production. Also disclosed as useful polyol sources are alkoxylated reaction products of the above co-polymers.

Further, U.S. Pat. No. 4,094,828 describes how a polyol combination comprising a co-polymer of allyl alcohol and styrene and a polyether polyol provides for rigid polyurethane foams possessing unusual dimensional stability and heat distortion properties. Amino polyols may be modified with epoxy resin and alkylene oxides according to the invention disclosed in U.S. Pat. No. 4,309,532. These modified polyols produce rigid polyurethane foams that have higher heat distortion temperatures and better low temperature properties than foams made with polyols not modified in such a fashion.

Rigid foams generally have good insulative properties and are thus desirable for use in building insulation. As with all building materials, it is desirable to provide rigid foams that are as fire resistant as possible. One approach to this goal is to modify the polyol.

Polyisocyanurate foams are a type which are considered to be fire resistant and show low smoke evolution on burning. However, polyisocyanurate foams tend to be brittle or friable. Various types of polyols have been devised to lower the foam friability, but what frequently happens is that the fire and smoke properties of the polyisocyanurate foam deteriorate. Thus, a fine balance exists between the amount and type of polyol one adds to a polyisocyanurate foam formulation in order to maintain maximum flame and smoke resistance while at the same time reach an improvement in foam friability. U.S. Pat. Nos. 4,039,487 and 4,092,276 describe attempts at this fine balance, although each has its disadvantages.

Scrap polyalkylene terephthalate, such as polyethylene terephthalate (PET) is known to be incorporated into polyurethanes. For example, U.S. Pat. No. 4,048,104 relates that polyisocyanate prepolymers for use in polyurethane products may be prepared by combining an organic polyisocyanate with polyols which are the hydroxyl-terminated digestion products of waste polyalkylene terephthalate polymers and organic polyols. A polyol ingredient which is the digestion product of polyalkylene terephthalate residues or scraps digested with organic polyols is also described in U.S. Pat. No. 4,223,068. Another case where terephthalic acid residues are employed is outlined in U.S. Pat. No. 4,246,365 where polyurethanes are made from polyesters containing at least two hydroxyl groups and terephthalic acid residues.

In U.S. Pat. No. 4,237,238, a polyol mixture is prepared by the transesterification of a residue from the manufacture of dimethyl terephthalate (DMT) with a glycol, which is then used to produce polyisocyanurate foams having a combination of a high degree of fire resistance with low smoke evolution, low foam friability and high compressive strength. The preparation of such a polyol mixture (from ethylene glycol and dimethyl terephthalate esterified oxidate residue) is described in U.S. Pat. No. 3,647,759. J. M. Hughes and John Clinton, in the Proceedings of the S.P.I. 25th Annual Urethane Division Technical Conference, Scottsdale, Ariz. (October 1979), describe other foams prepared from the polyols of U.S. Pat. No. 3,647,759. U.S. Pat. No. 4,233,408 teaches that polyurethane foams may be made from polyester precursors derived from adipic acid process waste. The reaction product of propylene oxide and a partially hydrolyzed DMT process residue is taught as being a useful polyol reactant in the preparation of urethane foams, according to U.S. Pat. No. 4,394,286.

Thus, by-products produced in the manufacture of adipic acid, PET or DMT have long been used as polyols in rigid urethanes. However, bis-hydroxyethyl terephthalate and the corresponding product made from diethylene glycol are solids and separate from solution over time. The resulting non-homogeneous solutions would be difficult to handle on a commercial scale. Such products are also terminated by primary hydroxyl groups, which make for a fast reaction with isocyanates. They also have poor compatibility with fluorocarbon-11, the blowing agent in rigid foams, and other polyols.

It would be desirable to provide an economical extender polyol which did not have the aforementioned disadvantages.

SUMMARY OF THE INVENTION

The invention concerns a mixture of liquid terephthalic ester polyols having hydroxyl and ester functionalities which are useful as extender polyols in preparing rigid foams. The mixtures are made by reacting recycled polyethylene terephthalate (PET) with diethylene glycol and at least one more oxyalkylene glycol. The mole ratio of glycols to recycled PET is greater than 1.2:1. Ethylene glycol is stripped from the reaction to give a mixture of esters which is free from solids upon standing.

DETAILED DESCRIPTION OF THE PREFERRED EMBODIMENTS

In general, it has been discovered that rigid foams, such as rigid polyurethane and rigid polyisocyanurate foams, may be made using the mixture of liquid terephthalic esters of this invention either alone or as polyol extenders together with other polyols. The term "polyol extender" is used to mean any inexpensive polyol material that can be used to replace a portion of a more expensive polyol in a foam formulation. Thus, the supply of expensive polyol is extended and the overall cost of the foam is lowered.

Not only are the polyol mixtures of this invention useful polyol extenders in rigid foams, but they also maintain their liquid phase state and do not precipitate solids upon standing. They thus retain their processing ease. In the preparation of rigid urethane foams the foam producer cannot tolerate solids in any feeds since they would stop up the filters or give erratic flow rates. In addition, such a polyol mixture is compatible with trichlorofluoromethane (fluorocarbon-11) blowing agent.

While one of the reactants could probably be adipic acid, DMT or PET manufacturing processing residue or waste; that is, any waste or residue stream which contains compounds having the moiety

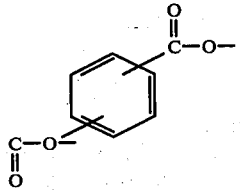

it is much preferred that the reactant of this type be scrap residue from old, recycled polyethylene terephthalate. By recycled PET is meant waste or scrap PET that has already been used in another foam and discarded.

Generally, the scrap or recycled PET may be in any particulate foam. A frequently seen form is fragmentized soft drink bottles which appear as clear or colored chips. Polyethylene terephthalate film can also be recycled. Any chopping or pulverizing process which produces small bits of solid PET from the larger, waste recycled article would be appropriate to produce scrap PET useful herein. Sometimes the scrap PET is mixed with a solvent to make a kind of slurry. While scrap PET slurry could be used in the method of this invention, the recycled PET chips without the solvent are also useful.

The recycled PET is first reacted with boiling oxyalkylene glycols. This process tends to form low molecular weight dihydroxy esters of terephthalic acid. Ordinarily, these diesters are quite crystalline and separate from solution as solids. Of course, the preferred products are the aromatic polyester polyol-type compounds.

Preferably, the oxyalkylene glycol has the formula

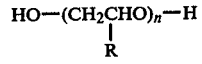

where R is hydrogen or lower alkyl of one to four carbon atoms and n is from 2 to 10. The glycol may be a residue or a flash-separated glycol. Glycols which meet this definition are diethylene glycol (DEG), dipropylene glycol, triethylene glycol (TEG), tripropylene glycol and tetrapropylene glycol, among others. Note that this definition of oxyalkylene glycols does not include ethylene glycol or propylene glycol.

It is essential that DEG be one of the oxyalkylene glycol reactants. It is also required that another oxyalkylene glycol be present as a co-reactant to help prevent the solids from settling out. Any single oxyalkylene glycol or mixture thereof can be used as the additional co-reactant with the DEG. Although exact proportions of these oxyalkylene glycols is not important, it is preferred that the DEG portion be the largest of the oxyalkylene glycol proportions.

Another requirement for the process to make the mixture of liquid terephthalic esters of this invention is that the mole ratio of all of the glycols to PET scrap is greater than 1.2:1. It will be shown that when this reactant mole ratio is equal to or less than 1.2:1 solids come out of the mixture after it is left standing.

The third important feature of the process for making the mixtures of this invention is the stripping of ethylene glycol (EG) during the reaction. The EG is derived from the PET during the reaction and contributes to the creation of the solids which tend to precipitate out when the mixtures are left standing. Preferably, at least 5 wt.% of the charge (the reactants) should be taken out as overhead, and at least 25 wt.% of this overhead is EG. It is especially preferred that 15 to 25 wt.% of the charge is stripped out as overhead, and most preferably, 17 to 20 wt.% as overhead.

The temperature of the preparation process should be from 190° to 280° C. Preferably, the temperature runs from about 210° to 245° C. The pressure should generally range from 1 to 40 atmospheres, preferably from 1 to 20 atmospheres. No catalyst is necessary for this preparation. The mixture of terephthalic ester polyols should have a hydroxyl number in the range from 100 to 500, with an especially preferred range between 200 and 400.

The functionality of the product may be increased by including one or more additives into the reaction to make the terephthalic ester polyol mixtures. Such additives include alpha-methyl glucoside (AMG), glycerine, triethanolamine, diethanolamine, sorbitol and the like. Typically, the additive is present in an amount ranging from about 1 to 5 wt.% based on the total reactant charge, although larger proportions could be used. It was found that use of as much as 2.5 wt.% glycerine tended to cause the undesirable precipitation of solids. If glycerine is used as a functionality-enhancing additive, it should be used in proportions less than 2.5 wt.%. The most preferred additive in this regard is AMG.

These ester polyol mixtures can serve as polyol extenders when they are blended with conventional polyols for use in polyurethane foams. The polyols of this invention can also be used alone to prepare isocyanurate foams.

There is good compatibility of the ester polyols of this invention with trichlorofluoromethane. Trichlorofluoromethane, sold under the tradename FREON ® R-11B, a conventional blowing agent, is the gas entrapped in closed-cell rigid foams which accounts for the excellent insulating properties of these foams.

The second constituent of the overall polyol combination found particularly useful in preparing rigid polyurethane foams is a polyether polyol having a hydroxyl number of 200-800. Usually the polyether polyol comprises 0-95 percent by weight of the total polyol combination weight. Preferred polyether polyols of this type are the reaction products of a polyfunctional active hydrogen initiator and propylene oxide, ethylene oxide or mixed propylene oxide and ethylene oxide. The polyfunctional active hydrogen initiator most preferably has a functionality of 2-8.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, trimethylolpropane, sucrose and alphamethyl glucoside.

Such above amines or alcohols may be reacted with an alkylene oxide such as ethylene oxide, propylene oxide, or mixed ethylene oxide and propylene oxide using techniques known to those skilled in the art. Thus, for example, the reaction of alkylene oxide with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol would determine the amount of alkylene oxide used to react with the initiator. As noted above, the polyether polyols useful here have a hydroxyl number ranging from about 200 to about 800. The reaction mixture is then neutralized and water and excess reactants are stripped from the polyol. The polyether polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator at once with propylene oxide and ethylene oxide mixture to achieve a random distribution of such alkylene oxides.

Especially preferred as the second polyol constituent are the nitrogen-containing polyether polyols described in U.S. Pat. Nos. 3,297,597 and 4,137,265, incorporated by reference herein. These particularly preferred polyols are marketed by Texaco Chemical Company as THANOL® R-350-X and THANOL R-650-X polyols. These polyols are prepared by reacting from 2 to 3 moles of propylene oxide with one mole of the Mannich reaction product of a mole of phenol or nonylphenol with one or two moles of diethanolamine and formaldehyde.

The final polyol combination more preferably comprises 0-95 percent by weight of said polyether polyol and 100-5 percent by weight of terephthalic ester polyol mixtures of this invention. Although the liquid terephthalic ester polyols of this invention may be used alone, it is preferred that they be present in an amount of from 30 to 70 weight percent of the polyol blend. The polyol combination in many instances has a total hydroxyl number ranging from about 100 to about 500.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)methane, bis(3-methyl-4-isocyanatophenyl)methane, and 4,4'-diphenylpropane diisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents; for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 weight percent methylene diphenyl diisocyanate isomers with the remainder being polymethylene polyphenyl diisocyanates having higher functionalities and higher molecular weights. Typical of these are polyphenyl polyisocyanate mixtures containing about 20 to 100 weight percent methylene diphenyl diisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. The isocyanate mixtures are known commercially available materials and can be prepared by the process described in U.S. Pat. No. 3,362,979, issued Jan. 9, 1968 to Floyd E. Bentley.

In the production of rigid polyurethane foams in the practice of the invention, other known additives are necessary. One such constituent is the blowing agent. Some examples of such material are trichloromonofluoromethane, dichlorodifluoromethane, dichloromonofluoromethane, 1,1-dichloro-1-fluoroethane, 1,1-difluoro-1,2,2-trichloroethane, chloropentafluoroethane, and the like. Other useful blowing agents include low-boiling hydrocarbons such as butane, pentane, hexane, cyclohexane, and the like. See U.S. Pat. No. 3,072,582, for example. The polyols of this invention are quite compatible with fluorocarbon blowing agents unlike some of the prior art polyols which are made from PET residues.

Surfactant agents, better known as silicone oils, are added to serve as a cell stabilizer. Some representative materials are sold under the names of L-520, L-521 and DC-193 which are, generally, polysiloxane polyoxyalkylene blocked co-polymers, such as those disclosed in U.S. Pat. Nos. 2,834,748; 2,917,480; and 2,846,458, for example.

Should fire retardancy be required for the polyurethane foam, two types of fire retardants are available; those that are incorporated by mere mechanical mixing and those that become chemically bound in the polymer chain. Representative of the first type are tris(chloroethyl)phosphate, tris(2,3-dibromopropyl)phosphate, diammonium phosphate, various halogenated compounds and antimony oxide. Representative of the chemically bound type are chlorendic acid derivatives, and various phosphorous-containing polyols.

The catalysts which may be used to make the foams of this invention are well known. There are two general types of catalyst, tertiary amines and organometallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in this invention are triethylenediamine, tetramethylenediamine, triethylamine, tripropylamine, tributylamine, triamylamine, pyridine, quinoline, dimethylpiperazine, dimethylhexahydroaniline, piperazine, N-ethylmorpholine, 2-methylpiperazine, dimethylaniline, nicotine, dimethylaminoethanol, tetramethylpropanediamine and methyltriethylenediamine. Useful organometallic compounds as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organometallic compound are often used together in the polyurethane reaction.

The rigid polyurethane foams prepared here can be made in one step by reacting all the ingredients together at once (one-shot process) or the rigid foams can be made by the so-called "quasi-prepolymer method." In accordance with this method, a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

In a preferred embodiment the amount of polyol combination is used such that the isocyanato groups are present in the foam in at least an equivalent amount, and preferably in slight excess, compared with the free hydroxyl groups. Preferably, the ingredients will be proportional so as to provide for about 1.05 to about 8.0 mole equivalents of isocyanato groups per mole equivalent of hydroxyl groups.

The invention will be illustrated further with respect to the following specific examples, which are given by way of illustration and not given as limitations on the scope of this invention. The synthesis of the polyols of this invention will be presented along with examples of how these polyol mixtures are used as polyol extenders to prepare foams.

Many modifications may be made in the polyol mixtures of this invention and their method of production without departing from the spirit and scope of the invention which is defined only in the appended claims. For example, one skilled in the art could adjust the temperature, pressure, reactants, proportions and modes of additions to provide polyol mixtures that give foams with optimal properties.

EXAMPLE 1 (COMPARATIVE)

To a five gallon stirred autoclave were added 3200 g of polyethylene terephthalate chips and 4800 g of diethylene glycol. The contents were flushed with nitrogen and then heated to 220° C. and held at this temperature for three hours without removing any overhead. The product had a hazy appearance and after one day solids began to separate. It had a hydroxyl number of 632.

EXAMPLE 2 (COMPARATIVE)

To a 500 ml reaction flask were added 80 g of polyethylene terephthalate chips and 120 g of diethylene glycol. The contents were flushed with nitrogen and then heated to 215° C. and held at this temperature for one hour without removing any overhead. The product was a fluid liquid upon cooling. After several days, solids began to separate. It had a hydroxyl number of 622.

EXAMPLE 3 (COMPARATIVE)

To a five gallon stirred autoclave were added 3200 g of polyethylene terephthalate chips and 4800 g of diethylene glycol. The contents were flushed with nitrogen and then heated to 220° C. After about three hours at 230° C. a total of 800 ml of overhead was collected. The overhead contained 5.7% water, 75.9% ethylene glycol and 18.4% diethylene glycol. The remainder was a liquid which had the following properties-hydroxyl number 493, viscosity 500 centistokes at 77° F. This product deposited white solids after standing several days.

EXAMPLE 4 (COMPARATIVE)

To a 500 ml reaction flask were added 80 g of polyethylene terephthalate chips, 90 g of diethylene glycol and 30 g of dipropylene glycol. The contents were flushed with nitrogen and then heated to 215° C. and held at this temperature for one hour without removing any overhead. The product was a fluid liquid upon cooling. After several days, solids began to separate. It had a hydroxyl number of 595.

EXAMPLE 5

To a 500 ml reaction flask were added 80 g of polyethylene terephthalate chips, 90 g of diethylene glycol and 30 g of dipropylene glycol. The contents were flushed with nitrogen and then heated to 220° C. After about six hours at 220°-228° C., a total of 20 ml of overhead was collected. The overhead contained 3.8% water, 59.1% ethylene glycol, and 35.9% diethylene glycol and/or dipropylene glycol. Upon cooling, the remainder was a liquid which had a hydroxyl number of 491. This product did not deposit any solids upon standing.

EXAMPLE 6

To a five gallon stirred autoclave were added 6000 g of polyethylene terephthalate chips, 5400 g of diethylene glycol and 3600 g of dipropylene glycol. The contents were flushed with nitrogen and then heated to 220° C. After about three hours at 220°-250° C. a total of 1500 ml of overhead was collected. The overhead contained 2.4% water, 54.5% ethylene glycol, 10.5% diethylene glycol and 29.2% dipropylene glycol. The reactor was cooled to room temperature and an additional 3000 g of polyethylene terephthalic chips were added to the autoclave. The contents were flushed with nitrogen and heated to 220° C. After about three hours at 230° C. a total of 1650 ml of overhead was collected. The overhead contained 1.7% water, 30.9% dipropylene glycol, 49.7% ethylene glycol and 15.4% diethylene glycol. The remainder was a liquid which had the following properties-hydroxyl number of 268 and vis-

EXAMPLE 7

To a five gallon stirred autoclave were added 6000 g of polyethylene terephthalate chips, 5400 g of diethylene glycol and 3600 g of dipropylene glycol. The contents were flushed with nitrogen and then heated to 220° C. After about three hours at 220°–250° C. a total of 1500 ml of overhead was collected. The overhead contained 5.6% water, 62.9% ethylene glycol, 4.5% diethylene glycol and 22.3% dipropylene glycol. The reactor was cooled to room temperature and an additional 3000 g of polyethylene terephthalate chips were added to the autoclave. The contents were flushed with nitrogen and heated to 220° C. After about three hours at 230° C. a total of 1650 ml of overhead was collected. The overhead contained 8.3% water, 54.5% ethylene glycol, 2.8% diethylene glycol and 14.8% dipropylene glycol. The remainder was a liquid which had the following properties—hydroxyl number of 253 and viscosity of 16538 centistokes at 77° F. This product did not deposit any solids after standing for one month.

EXAMPLE 8

To a 1000 ml reaction flask were added 300 g of polyethylene terephthalate, 180 g of diethylene glycol and 120 g of a dipropylene glycol blend, M-103, obtained from Arco Chemical Company. The dipropylene glycol blend contained 82.0% dipropylene glycol, 16.8% tripropylene glycol and 1.0% tetrapropylene glycol. The contents of the flask were flushed with nitrogen and heated to 220° C. After about 2.5 hours at 220°–240° C., 100 ml of overhead was collected. The remainder was a liquid upon cooling which had a hydroxyl number of 245. This product did not deposit any solids upon standing.

EXAMPLE 9

To a five gallon autoclave were added 7582.8 g of polyethylene terephthalate, 4549.7 g of diethylene glycol and 3033.1 g of the Arch Chemical Co. dipropylene glycol blend, M-103. The contents of the flask were flushed with nitrogen and heated to 220° C. After about 4 hours at 220°–250° C., 2400 ml of overhead was collected. The remainder was a liquid upon cooling which had a hydroxyl number of 244. This product did not deposit any solids upon standing.

EXAMPLE 10

To a 1000 ml reaction flask were added 192 g of polyethylene terephthalate, 115.2 g of diethylene glycol, 72.9 g of dipropylene glycol and 3.8 g of alpha methyl glucoside. The contents of the flask were flushed with nitrogen and heated to 235° C. After about two hours at 235° C., 60 ml of overhead was collected. The remainder was a liquid upon cooling which had a hydroxyl number of 316. This product did not deposit any solids upon standing.

EXAMPLE 11

To a 1000 ml reaction flask were added 300 g of polyethylene terephthalate, 180 g of diethylene glycol, 120 g of the Arco Chemical Co. dipropylene glycol blend, M-103, and 6.0 g of alpha methyl glucoside. The contents of the flask were flushed with nitrogen and heated to 240° C. After about 2 hours at 240° C., 100 ml of overhead was collected. The remainder was a liquid upon cooling which had a hydroxyl number of 278. This product did not deposit any solids upon standing.

EXAMPLE 12

To a 1000 ml reaction flask were added 192 g of polyethylene terephthalate, 115.2 g of diethylene glycol, 72.9 g of dipropylene glycol and 3.8 g of glycerine. The contents of the flask were flushed with nitrogen and heated to 240° C. After about two hours at 240° C., 60 ml of overhead was collected. The remainder was a liquid upon cooling which had a hydroxyl number of 324. This product did not deposit any solids upon standing.

EXAMPLE 13 (COMPARATIVE)

To a 1000 ml reaction flask were added 192 g of polyethylene terephthalate, 101.8 g of diethylene glycol, 32.2 g of dipropylene glycol and 8.2 g of alpha methyl glucoside. The contents of the flask were flushed with nitrogen and heated to 235° C. After about 3 hours at 235° C., 30 ml of overhead was collected. The remainder was a liquid upon cooling which had a hydroxyl number of 296. This product did deposit solids upon standing.

EXAMPLE 14 (COMPARATIVE)

To a 1000 ml reaction flask were added 192 g of polyethylene terephthalate, 101.8 g of diethylene glycol, 32.2 g of dipropylene glycol and 8.2 g of glycerine. The contents of the flask were flushed with nitrogen and heated to 225° C. After about one hour at 225° C., 30 ml of overhead was collected. The remainder was a liquid upon cooling which had a hydroxyl number of 327. This product did deposit solids upon standing.

EXAMPLE 15 (COMPARATIVE)

To a 1000 ml reaction flask were added 192 g of polyethylene terephthalate, 115 g of diethylene glycol, 72.9 g of dipropylene glycol and 9.7 g of glycerine. The contents of the flask were flushed with nitrogen and heated to 225° C. After about one hour at 225° C., 35 ml of overhead was collected. The remainder was a liquid upon cooling which had a hydroxyl number of 431. This product did deposit solids upon standing.

EXAMPLE 16

To a 1000 ml reaction flask were added 192 g of polyethylene terephthalate, 115.2 g of diethylene glycol, 72.9 g dipropylene glycol and 9.7 g of alpha methyl glucoside. The contents of the flask were flushed with nitrogen and heated to 235° C. After about 2 hours at 236° C., 35 ml of overhead was collected. The remainder was a liquid upon cooling which had a hydroxyl number of 387. This product did not deposit solids upon standing.

EXAMPLE 17

To a 1000 ml reaction flask were added 192 g of polyethylene terephthalate, 115.2 g of diethylene glycol, 72.9 g of dipropylene glycol and 3.8 g of triethanolamine. The contents of the flask were flushed with nitrogen and heated to 230° C. After about 2 hours at 230° C., 60 ml of overhead was collected. The remainder was a liquid upon cooling which had a hydroxyl number of 321. This product did not deposit solids upon standing.

EXAMPLE 18

To a 1000 ml reaction flask were added 192 g of polyethylene terephthalate, 115.2 g of diethylene glycol, 72.9 g of dipropylene glycol and 3.8 g of diethanolamine. The contents of the flask were flushed with nitrogen and heated to 220° C. After about 3 hours at 230° C., 60 ml of overhead was collected. The remainder was a liquid upon cooling which had a hydroxyl number of 294. This product did not deposit solids upon standing.

EXAMPLE 19

To a 1000 ml reaction flask were added 240 g of polyethylene terephthalate, 172.8 g of diethylene glycol, 43.2 g of dipropylene glycol and 24 g of alpha methyl glucoside. The contents of the flask were flushed with nitrogen and heated to 220° C. After about 4 hours at 234° C., 40 ml of overhead was collected. The remainder was a liquid upon cooling which had a hydroxyl number of 405. This product did not deposit solids upon standing.

EXAMPLE 20

To a two liter 3-necked flask were added 500 g of PET resin (2.6 moles), 400 g of diethylene glycol (3.8 moles), 100 g of PEG-200 (polyethylene glycol with an average molecular weight of 200) and 2 ml of tetraisopropyl titanate. A stirrer, nitrogen inlet, condenser and K-head were attached. The materials were heated to 226° C. at which time condensation was collected overhead. After 2.5 hours at 226°-240° C., a total of 175 ml of overhead was collected. The bottoms was a fluid liquid which had a hydroxyl number of 239. In this example, like all of the inventive examples herein, at least 25 wt.% of the overhead was ethylene glycol.

Example 1 describes an experiment in which only PET and diethylene glycol are used. No overhead is taken off. Example 2 is similar to Example 1 except on a smaller scale. Example 3 is similar to Example 1 except some of the ethylene glycol is removed by distillation; however, no other oxyalkylene glycol is used so solids appear. Example 4 is similar to Example 1 except dipropylene glycol has been added to the reactants. No overhead has been taken out of the product by distillation. The product does deposit solids upon standing. Example 5 is similar to Example 4 except that some of the ethylene glycol has been removed from the product by distillation. The resulting product does not deposit any solids upon standing. Example 6 is very similar to Example 5. The only difference is the size of the reactor. Example 6 was completed in a five gallon reactor. Example 7 is a repeat of Example 5 showing that the liquid product can be made reproducibly. Example 8 shows that a dipropylene glycol bottoms stream, M-103, could be substituted for the dipropylene glycol used to make the liquid product. Example 9 is very similar to Example 8 except that the size of the reactor used and the amount of product made has been increased.

To increase the functionality of the product, several additives were added to the reactants. Example 10 illustrates the use of alpha-methyl glucoside in the reaction. The result is a fluid liquid product. Example 11 illustrates that alpha-methyl glucoside can be used with the dipropylene glycol bottoms stream, M-103. Examples 12, 16, 17 and 18 also illustrate that glycerine, triethanolamine and diethanolamine can also be used to increase the functionality of the product.

Products containing various amounts of an additive (Table I) to increase the functionality of the product can have solids present in them if the mole ratio of the glycols to PET is equal to or less than 1.2 (glycols/PET). For example, in Examples 13 and 14, there is 2.5% of either glycerine or alpha-methyl glucoside present in the reactants. The sum of the moles of diethylene glycol and dipropylene glycol is 1.20 moles. The number of moles of PET is 1.0. The mole ratio of the glycols to PET would be 1.20 (1.20/1.0). Examples 13 and 14 deposited solids upon standing.

Example 19 has 5% alpha-methyl glucoside in the reactants and a mole ratio of glycols of PET of 1.56 (1.95/1.25). Example 19 did not deposit any solids upon standing even with a higher percentage of alpha-methyl glucoside. Examples 10, 12, 16, 17 and 18 also did not deposit any solids. These examples were run at a mole ratio of glycols to PET of 1.63. Example 15 did deposit solids after standing a few days. Example 15 contained 2.5% glycerine in the reactants while Example 12 contained 1% glycerine in the reactants and did not deposit any solids in the product. Glycerine apparently has a greater tendency to deposit solids at 2.5% concentration than alpha-methyl glucoside at 2.5%.

TABLE I
SUMMARY OF SOME OF THE EXAMPLES

| | Example No. | | | | | | | | |
|---|---|---|---|---|---|---|---|---|---|
| | 13 | 14 | 19 | 12 | 10 | 16 | 17 | 18 | 15 |
| PET, moles[1] | 1.00 | 1.00 | 1.25 | 1.00 | 1.00 | 1.00 | 1.00 | 1.00 | 1.00 |
| DEG, moles | 0.96 | 0.96 | 1.63 | 1.09 | 1.09 | 1.09 | 1.09 | 1.09 | 1.09 |
| DPG, moles | 0.24 | 0.24 | 0.32 | 0.54 | 0.54 | 0.54 | 0.54 | 0.54 | 0.54 |
| Mole Ratio (DEG + DPG)/PET | 1.20 | 1.20 | 1.56 | 1.63 | 1.63 | 1.63 | 1.63 | 1.63 | 1.63 |
| Glycerine, % | — | 2.5 | — | 1.0 | — | — | — | — | 2.5 |
| AMG, %[2] | 2.5 | — | 5.0 | — | 1.0 | 2.5 | — | — | — |
| DEA, %[3] | — | — | — | — | — | — | 1.0 | — | — |
| TEA, %[4] | — | — | — | — | — | — | — | 1.0 | — |
| Solids | Yes | Yes | No | No | No | No | No | No | Yes |

[1]The molecular weight of polyethylene terephthalic is assumed to be 192
[2]AMG is alpha-methyl glucoside
[3]DEA is diethanolamine
[4]TEA is triethanolamine

Preparation of Fire Retarded Rigid Polyurethane and Polyisocyanurate Foams

The experimental aromatic polyester polyols were used as extender polyols at the 30% level in THANOL ®R-350-X and THANOL R-650-X polyurethane formulations or as the sole polyol in polyisocyanurate formulations.

Formulation components were mixed at 2700 rpm and poured into 8"×8"×6" (600 g pour) or 5"×8"×6" (200 g pour) open molds and allowed to rise. The resulting foams were allowed to stand at room temperature for at least three days before testing. Formulations, reaction profiles, visual observations and physical properties are listed in Table II.

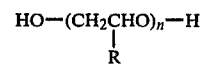

where R is hydrogen or lower alkyl of 1 to 4 carbon atoms and n is from 2 to 10.

TABLE II

| Formulation, pbw | Rigid Polyurethane Foams | | | | | | | | Isocyanurate Foams* | | | |
|---|---|---|---|---|---|---|---|---|---|---|---|---|
| | A | B | C | D | E | F | G | H | I | J | K | L |
| THANOL ® R-350-X (OH = 534) | 25.1 | — | 24.9 | — | 25.3 | — | 25.3 | — | — | — | — | — |
| THANOL R-650-X (OH = 451) Mixture, | — | 27.2 | — | 26.9 | — | 27.2 | — | 27.2 | — | — | — | — |
| Ex. 6 (OH = 268) | 10.7 | 11.7 | — | — | — | — | — | — | 20.5 | — | — | — |
| Ex. 11 (OH = 278) | — | — | 10.7 | 11.5 | — | — | — | — | — | 34.8 | — | — |
| Ex. 8 (OH = 245) | — | — | — | — | 10.8 | 11.7 | — | — | — | — | 37.3 | — |
| Ex. 9 (OH = 244) | — | — | — | — | — | — | 10.8 | 11.7 | — | — | — | 37.3 |
| ANTIBLAZE ®80[1] | 5.0 | 5.0 | 5.0 | 5.0 | 5.0 | 5.0 | 5.0 | 5.0 | — | 5.0 | 5.0 | 5.0 |
| Water, wt. % | 0.2 | 0.2 | 0.2 | 0.2 | 0.2 | 0.2 | 0.2 | 0.2 | | | | |
| FREON ® R-11[2] | 12.0 | 12.0 | 12.0 | 12.0 | 12.0 | 12.0 | 12.0 | 12.0 | 12.0 | 12.0 | 12.0 | 12.0 |
| L-5420[3] | 0.5 | 0.5 | 0.5 | 0.5 | 0.5 | 0.5 | 0.5 | 0.5 | — | — | — | — |
| FOMREZ ® UL-32[4] | 0.01 | 0.01 | 0.01 | 0.01 | 0.01 | 0.01 | 0.01 | 0.01 | — | — | — | — |
| Silicone DC-193[5] | — | — | — | — | — | — | — | — | 0.5 | 0.5 | 0.5 | 0.5 |
| T-45[6] | — | — | — | — | — | — | — | — | 1.5 | 1.5 | 1.5 | 1.5 |
| MONDUR ® MR[7] | 46.5 | 43.4 | 46.7 | 43.9 | 46.2 | 43.4 | 46.2 | 43.4 | 65.5 | 46.2 | 43.7 | 43.7 |
| Index | 1.2 | 1.2 | 1.2 | 1.2 | 1.2 | 1.2 | 1.2 | 1.2 | 5.0 | 2.0 | 2.0 | 2.0 |
| Times, secs, | | | | | | | | | | | | |
| mixing | 10 | 8 | 10 | 8 | 10 | 8 | 10 | 8 | 3 | 3 | 3 | 3 |
| cream | 14 | 13 | 17 | 15 | 17 | 15 | 17 | 15 | 6 | 6 | 6 | 6 |
| gel | 57 | 53 | 63 | 52 | 62 | 55 | 63 | 58 | 21 | 17 | 18 | 19 |
| tack free time | 83 | 69 | 85 | 65 | 88 | 69 | 85 | 66 | 65 | 19 | 19 | 21 |
| rise | 123 | 120 | 136 | 128 | 133 | 126 | 138 | 124 | 58 | 42 | 36 | 50 |
| Initial surface friability | none | none | none | none | none | none | none | none | yes | yes | yes | yes |
| Foam appearance | good | good | good | good | good | good | good | good | good | fair | good | fair |
| Density, lb/ft$^3$ | 1.91 | 2.01 | 1.89 | 2.01 | 1.86 | 2.02 | 1.89 | 2.02 | 2.08 | — | 1.76 | — |
| K-factor | 0.121 | 0.125 | 0.121 | 0.120 | 0.123 | 0.123 | 0.117 | 0.117 | 0.138 | — | — | — |
| Comp. str. (psi) | | | | | | | | | | | | |
| with rise | 41.25 | 43.55 | 43.86 | 41.83 | 41.21 | 43.84 | 45.07 | 40.19 | 40.94 | — | 26.36 | — |
| against rise | 12.54 | 14.25 | 12.73 | 14.66 | 12.14 | 13.33 | 13.48 | 14.49 | 17.68 | — | 7.61 | — |
| Heat distortion, °C. | 144 | 128 | 115 | 111 | 122 | 132 | 120 | 108 | >220 | — | 110 | — |
| Closed cells, % | 93.62 | 92.35 | 91.25 | 91.53 | 91.82 | 91.65 | 91.81 | 92.15 | 90.92 | — | 92.54 | — |
| Friability, % wt. loss, 10 minutes | 1.79 | 2.72 | 2.69 | 2.02 | 0.36 | 2.01 | 3.03 | 2.48 | 49.47 | — | 1.41 | — |
| ASTM 1962 burn, in/min (BHA) | 1.59 | 1.44 | 1.57 | 1.45 | 1.54 | 1.48 | 1.89 | 1.57 | 1.61 | — | — | — |
| Butler Chimney Test | | | | | | | | | | | | |
| Flame height, in. | >11 | >11 | >11 | >11 | >11 | >11 | >11 | >11 | 6.17 | — | — | — |
| Secs. to extinguish | 12 | 11 | 17 | 17 | 12 | 12 | 10 | 13 | 10 | — | — | — |
| Wt. % retained | 69.5 | 80.4 | 69.0 | 70.8 | 71.8 | 74.8 | 77.3 | 74.1 | 93.9 | — | — | — |

*Isocyanurate foams J and L were not tested for properties.
[1]Tris-(2-chloropropyl)phosphate, a fire retardant sold by Mobil Chemical.
[2]Trichlorofluoromethane.
[3]A silicone surfactant sold by Union Carbide Corp.
[4]A tin catalyst sold by Witco Chemical Corp.
[5]A silicone surfactant made by Dow-Corning Corp.
[6]Potassium octoate in glycol made by M&T Chemical Co.
[7]A polymeric isocyanate sold by Mobay Chemical Co.

We claim:

1. A mixture of liquid terephthalic ester polyols produced by the process comprising
   a. reacting recycled polyethylene terephthalate with diethylene glycol and at least one more oxyalkylene glycol, where the mole ratio of glycols to recycled polyethylene terephthalate is greater than 1.2:1, and
   b. stripping off as overhead at least 5 wt.% of the reaction product from step a. based on the reactants charged, where at least 25% of the overhead is ethylene glycol, to give a mixture of esters which is free from solids upon standing.

2. The mixture of claim 1 in which the oxyalkylene glycol has the formula

3. The mixture of claim 1 in which a functionality-enhancing additive is present during the reaction, which is selected from the group consisting of alpha-methyl glucoside, triethanolamine, diethanolamine and glycerine.

4. The mixture of claim 1 in which alpha-methyl glucoside is present during the reaction as a functionality-enhancing additive.

5. The mixture of claim 1 in which glycerine is present during the reaction as a functionality-enhancing additive in an amount of less than 2.5 wt.% based on the total weight of reactants charged.

6. The mixture of claim 1 in which the process is conducted at a temperature in the range from about 190° to 280° C. and at a pressure between about 1 to 20 atmospheres.

7. The mixture of claim 1 in which the average hydroxyl number of the resultant mixture is between 100 and 500.

8. A rigid polyurethane foam obtained from reacting in the presence of a blowing agent and a catalyst of polyurethane formation an organic polyisocyanate and a polyol comprising the mixture of liquid terephthalic ester polyols of claim 1.

9. A rigid polyisocyanurate foam obtained by reacting in the presence of a blowing agent and a trimerization catalyst of polyisocyanurate formation, an organic polyisocyanate and a polyol component comprising the mixture of liquid terephthalate ester polyols of claim 1.

10. A mixture of liquid terephthalic ester polyols produced by the process comprising
    a. reacting recycled polyethylene terephthalate with diethylene glycol and at least one more oxyalkylene glycol, selected from the group of glycols having the formula $$HO-(CH_2CHO)_n-H$$
    $$\phantom{HO-(CH_2CH}|$$
    $$\phantom{HO-(CH_2CHO)_n-}R$$

where R is hydrogen or lower alkyl of 1 to 4 carbon atoms and n is from 2 to 4, where the mole ratio of glycols to recycled polyethylene terephthalate is greater than 1.2:1,
    b. stripping at least 5 wt.%, based on the reactants charged, as overhead where at least 25 wt.% of the overhead is ethylene glycol, to give a mixture of esters which is free from solids upon standing having a hydroxyl number between 100 and 500.

11. A process for the production of a mixture of liquid terephthalic ester polyols comprising
    a. reacting recycled polyethylene terephthalate with diethylene glycol and at least one more oxyalkylene glycol, where the mole ratio of glycols to recycled polyethylene terephthalate is greater than 1.2:1, and
    b. stripping off as overhead at least 5 wt.% of the reaction product from step a. based on the reactants charged, where at least 25 wt.% of the overhead is ethylene glycol, to give a mixture of esters which is free from solids upon standing.

12. The process of claim 11 in which the oxyalkylene glycol has the formula $$HO-(CH_2CHO)_n-H$$
    $$\phantom{HO-(CH_2CH}|$$
    $$\phantom{HO-(CH_2CHO)_n-}R$$

where R is hydrogen or lower alkyl of 1 to 4 carbon atoms and n is from 2 to 10.

13. The process of claim 11 in which a functionality-enhancing additive is present during the reaction, which is selected from the group consisting of alpha-methyl glucoside, triethanolamine, diethanolamine and glycerine.

14. The process of claim 11 in which alpha-methyl glucoside is present during the reaction as a functionality-enhancing additive.

15. The process of claim 11 in which glycerine is present during the reaction as a functionality-enhancing additive in an amount of less than 2.5 wt.% based on the total weight of reactants charged.

16. The process of claim 11 in which the process is conducted at a temperature in the range from about 190° to 280° C. and at a pressure between about 1 to 20 atmospheres.

17. The process of claim 11 in which the average hydroxyl number of the resultant mixture is between 100 and 500.

* * * * *